(12) United States Patent
Mukherjee et al.

(10) Patent No.: US 10,983,758 B1
(45) Date of Patent: Apr. 20, 2021

(54) SYSTEM, METHOD, AND COMPUTER PROGRAM PRODUCT FOR AUTOMATICALLY INFERRING CASE-SPLIT HINTS IN EQUIVALENCE CHECKING OF AN ELECTRONIC DESIGN

(71) Applicant: Cadence Design Systems, Inc., San Jose, CA (US)

(72) Inventors: Rajdeep Mukherjee, San Jose, CA (US); Benjamin Meng-Ching Chen, Los Altos, CA (US); Habeeb Farah, Nazareth (IL); Ziyad Hanna, Haifa (IL)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/538,900

(22) Filed: Aug. 13, 2019

(51) Int. Cl.
*G06F 8/20* (2018.01)
*G06F 8/10* (2018.01)

(52) U.S. Cl.
CPC . *G06F 8/20* (2013.01); *G06F 8/10* (2013.01)

(58) Field of Classification Search
CPC ...... G06F 30/3323; G06F 30/33; G06F 11/26; G06F 30/30; G06F 30/327; G06F 17/10; G06F 2117/08; G06F 2119/06; G06F 30/331; G06F 7/5338; G06F 1/3237; G06F 11/3644; G06F 16/9027; G06F 2117/04; G06F 2119/12; G06F 2119/16; G06F 30/3308; G06F 30/3312; G06F 30/367; G06F 30/398; G01R 31/318364; G01R 31/31704; G01R 31/31705; G01R 31/318357
USPC .................................................. 716/100–109
See application file for complete search history.

(56) References Cited

U.S. PATENT DOCUMENTS

| 7,386,820 B1 * | 6/2008 | Koelbl | G06F 30/3323 716/107 |
| 2008/0028347 A1 * | 1/2008 | Hiraoglu | G06F 30/3323 716/103 |
| 2013/0227505 A1 * | 8/2013 | Tanimoto | G06F 30/30 716/107 |

* cited by examiner

*Primary Examiner* — Binh C Tat
(74) *Attorney, Agent, or Firm* — Mark H. Whittenberger, Esq.; Holland & Knigth LLP (57) ABSTRACT

The present disclosure relates to a method for use in a formal verification of an electronic design. Embodiments may include receiving, using a processor, a reference model including a software specification and an implementation model at a register transfer level. Embodiments may also include generating one or more invariants based upon, at least in part, the reference model, wherein generating one or more invariants includes applying a semantic analysis. Embodiments may further include automatically generating at least one case splitting candidate based upon, at least in part, the one or more generated invariants.

20 Claims, 9 Drawing Sheets

202 — receiving, using a processor, a reference model including a software specification and an implementation model at a register transfer level 204 — generating one or more invariants based upon, at least in part, the reference model, wherein generating one or more invariants includes applying a semantic analysis 206 — automatically generating at least one case splitting candidate based upon, at least in part, the one or more generated invariants

```
include <new> template <class T>
class MyNumber {
public:
    MyNumber(const T& val) {
        m_val = val;
    }
    T operator+(const MyNumber<T>& v) {
        return m_val + v.m_val;
    }
private:
    T m_val;
};

int main () {
    int a, b;
    RTL_INPUT(int, a);
    RTL_INPUT(int, b);

unsigned char bufA[8];
    unsigned char bufB[8];
    MyNumber<int>* ma = new(bufA)MyNumber<int>(a);
    MyNumber<int>* mb = new(bufB)MyNumber<int>(b);

const int c = (*ma) + (*mb);

RTL_OUTPUT(int, c);
    return c;
}
```

```
struct _Z8MyNumberIiE {
    int m_val;
};

void _ZN8MyNumberIiEC1ERKi( struct _Z8MyNumberIiE *const thisptr, const int * __37_23_val) {
    (thisptr->m_val) = (*__37_23_val);
} int _ZN8MyNumberIiEplERKS0_( struct _Z8MyNumberIiE *const thisptr, const struct _Z8MyNumberIiE * __40_36_v) {
    return (thisptr->m_val) + (__40_36_v->m_val);
} int main(void)
{
    { auto int __49_9_a; auto int __49_12_b;
      auto unsigned char __52_19_bufA[8];
      auto unsigned char __53_19_bufB[8];
      auto struct _Z8MyNumberIiE * __54_20_ma;
      auto struct _Z8MyNumberIiE * __55_20_mb;
      auto int __56_15_c;
      { auto int __50_5___RTL_INPUT___a; __49_9_a = __50_5___RTL_INPUT___a; };
      { auto int __51_5___RTL_INPUT___b; __49_12_b = __51_5___RTL_INPUT___b; };
      __54_20_ma = ((struct _Z8MyNumberIiE *)(__T24960376 = ((void *)(__52_19_bufA)),
      __55_20_mb = ((struct _Z8MyNumberIiE *)(__T24960376 = ((void *)(__53_19_bufB)),
      __56_15_c = _ZN8MyNumberIiEplERKS0_(__54_20_ma, __55_20_mb);
      { auto int __57_5___RTL_OUTPUT___c; __57_5___RTL_OUTPUT___c = __56_15_c; };
      return __56_15_c;
    }
}
```

SYSTEM, METHOD, AND COMPUTER PROGRAM PRODUCT FOR AUTOMATICALLY INFERRING CASE-SPLIT HINTS IN EQUIVALENCE CHECKING OF AN ELECTRONIC DESIGN

FIELD OF THE INVENTION

The present disclosure relates to electronic design verification, and more specifically, to a method for performing sequential equivalence checking.

DISCUSSION OF THE RELATED ART

Formal verification relies upon a system of constraints to communicate the legal state space to the proof engines. Conventional technologies are limited in their ability to synthesize software specifications written using advanced language features, which consequently reduces their scope for usability in designs that are continuously evolving. The main reason for the language coverage problem is due to the frequent enhancements of the language standards such as $C^{++}$ or SystemC, as well as, availability of new standard libraries. Developers of the software specification use these modern language features to implement various functionalities while the design evolves over time.

In conventional techniques, the formal verification model generated from the software specification is targeted for equivalence checking. Some types of equivalence may include combinational equivalence, cycle accurate equivalence, transaction equivalence, and pipelined equivalence. In a $C/C^{++}$ versus register transfer level ("RTL") sequential equivalence checking problem questions often surround how the inputs of both designs must be stimulated and when and how their outputs must be compared.

SUMMARY OF DISCLOSURE

In one or more embodiments of the present disclosure, a computer-implemented method for use in a formal verification of an electronic design. The method may include receiving, using a processor, a reference model including a software specification and an implementation model at a register transfer level. The method may also include generating one or more invariants based upon, at least in part, the reference model, wherein generating one or more invariants includes applying a semantic analysis. The method may further include automatically generating at least one case splitting candidate based upon, at least in part, the one or more generated invariants.

One or more of the following features may be included. In some embodiments, the software specification is in C language or C++ language and the implementation model is written in Verilog RTL. Automatically generating may occur during performing equivalence checking. The one or more invariants may be utilized as a case splitting hint. The one or more invariants may be utilized as a helper assertion or a cut point. The one or more invariants may be utilized to derive one or more structural properties of a program. Generating one or more invariants may be based upon, at least in part, one or more internal variables. The method may include providing the at least one case splitting candidate to an equivalence checker. The method may further include providing the one or more invariants to an equivalence checker. The method may also include providing the helper assertion or cut point to an equivalence checker.

In one or more embodiments of the present disclosure, a system for electronic design verification is provided. The system may include one or more processors configured to receive a reference model including a software specification and an implementation model at a register transfer level. The at least one processor may be further configured to generate one or more invariants based upon, at least in part, the reference model, wherein generating one or more invariants includes applying a semantic analysis. The at least one processor may be further configured to automatically generate at least one case splitting candidate based upon, at least in part, the one or more generated invariants.

One or more of the following features may be included. In some embodiments, the software specification is in C language or C++ language and the implementation model is written in Verilog RTL. Automatically generating may occur during performing equivalence checking. The one or more invariants may be utilized as a case splitting hint, as a helper assertion, and/or as a cut point. The one or more invariants may be utilized to derive one or more structural properties of a program. Generating one or more invariants may be based upon, at least in part, one or more internal variables. The at least one processor may be further configured to provide the at least one case splitting candidate to an equivalence checker. The at least one processor may be further configured to provide the one or more invariants to an equivalence checker. The at least one processor may be further configured to provide the helper assertion or cut point to an equivalence checker.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIG. 8 is an example showing machine generated semantic preserving transformation from $C^{++}$ to C; and FIG. 9 is an example showing the synthesis of lowered C to RTL.

DETAILED DESCRIPTION

Embodiments of the present disclosure present an automatic technique for generating a formal verification model from a software specification for equivalence checking against an implementation model. As is discussed in further detail below, embodiments may utilize automatic invariant generation to automatically infer case-splitting hints in equivalence checking.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

One or more hardware description languages may be used in accordance with the present disclosure. Some hardware description languages may include, but are not limited to, Verilog, VHDL, SystemC, SystemVerilog and Verilog-AMS. Various other hardware description languages may also be used as well.

Figure 1:
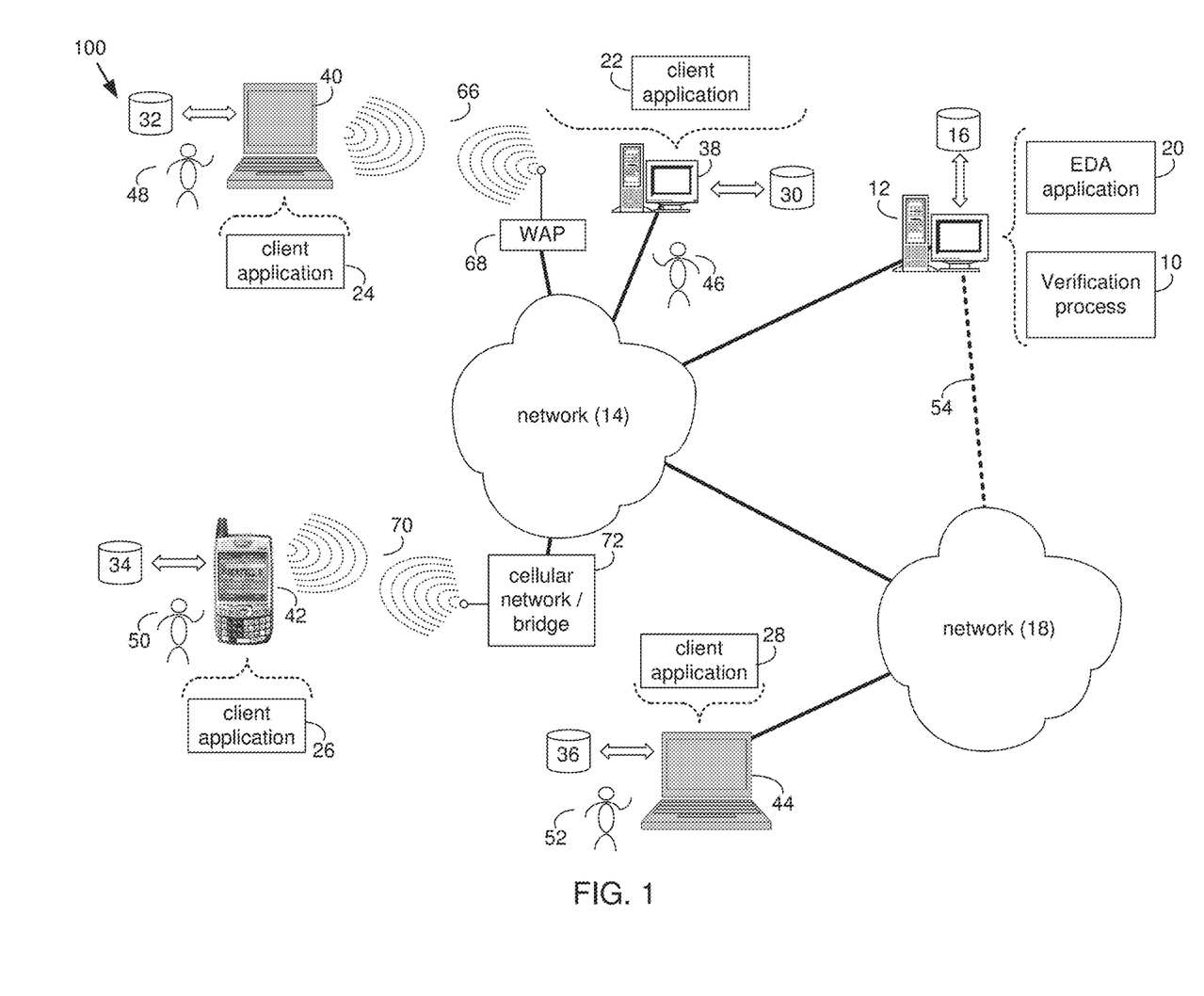
FIG. 1 is a diagram depicting an embodiment of a system in accordance with the present disclosure.

Referring to FIG. 1, there is shown a verification process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, verification process 10 may reside on and be executed, in whole or in part, by a client electronic device, such as a personal computer, notebook computer, personal digital assistant, or the like.

The instruction sets and subroutines of verification process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for electronic design optimization.

Verification process 10 may be a stand alone application, or may be an applet/application/script that may interact with and/or be executed within EDA application 20. In addition/ as an alternative to being a server-side process, verification process 10 may be a client-side process (not shown) that may reside on a client electronic device (described below) and may interact with an EDA client application (e.g., one or more of EDA client applications 22, 24, 26, 28). Further, verification process 10 may be a hybrid server-side/client-side process that may interact with EDA application 20 and an EDA client application (e.g., one or more of client applications 22, 24, 26, 28). As such, verification process 10 may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize verification process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both).

Figure 2:
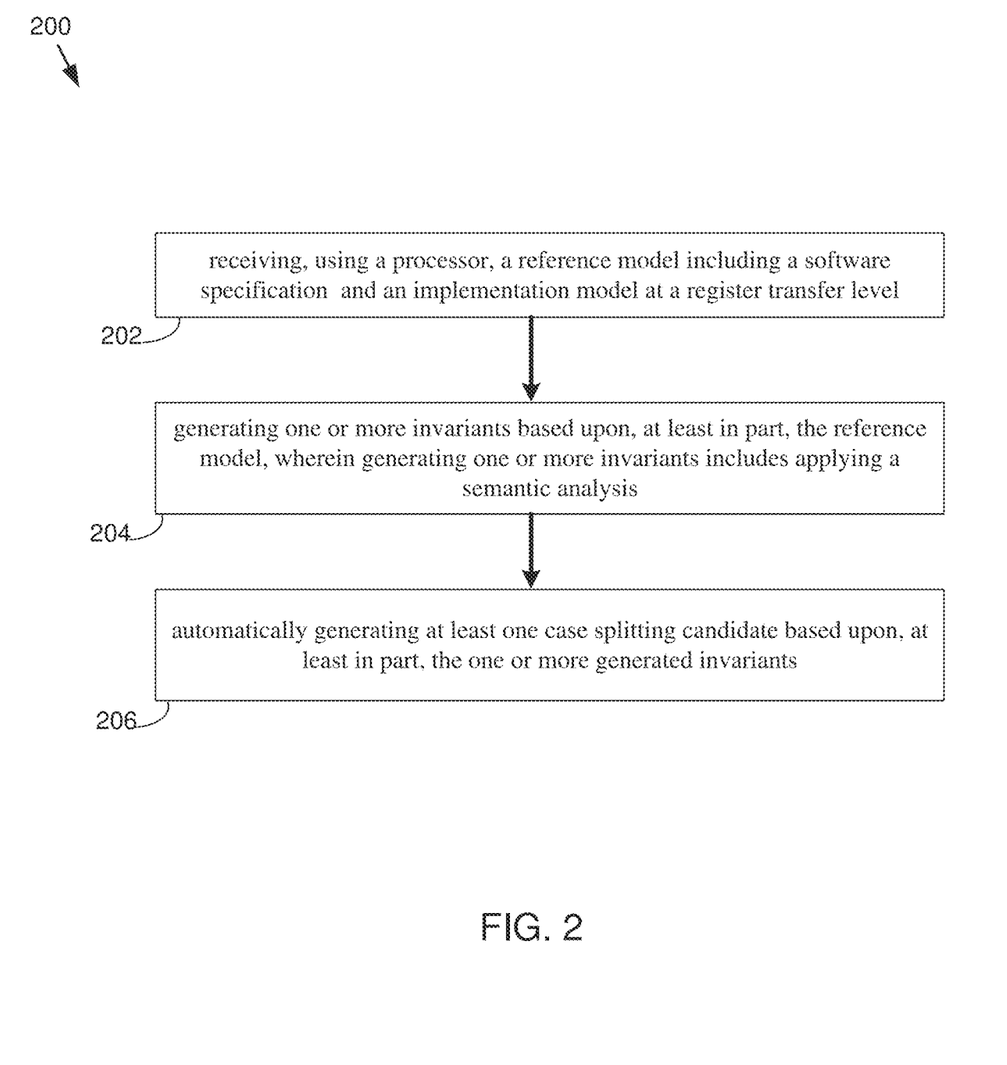
FIG. 2 is a flowchart depicting operations consistent with the verification process in accordance with an embodiment of the present disclosure.

Referring now to FIG. 2, an exemplary flowchart 200 depicting operations for use in accordance with verification process 10 is provided. Embodiments may include receiving (202), using a processor, a reference model including a software specification and an implementation model at a register transfer level. Embodiments may also include generating (204) one or more invariants based upon, at least in part, the reference model, wherein generating one or more invariants includes applying a semantic analysis. Embodiments may further include automatically generating (206) at least one case splitting candidate based upon, at least in part, the one or more generated invariants.

In some embodiments, verification process 10 presents an automatic technique for generating a formal verification model from a software specification for equivalence checking against an implementation model. Verification process 10 may employ a semantic transformation-based synthesis technology automatically deriving case-splitting hints for C/C++ versus register transfer level ("RTL") sequential equivalence checking.

Figure 3:
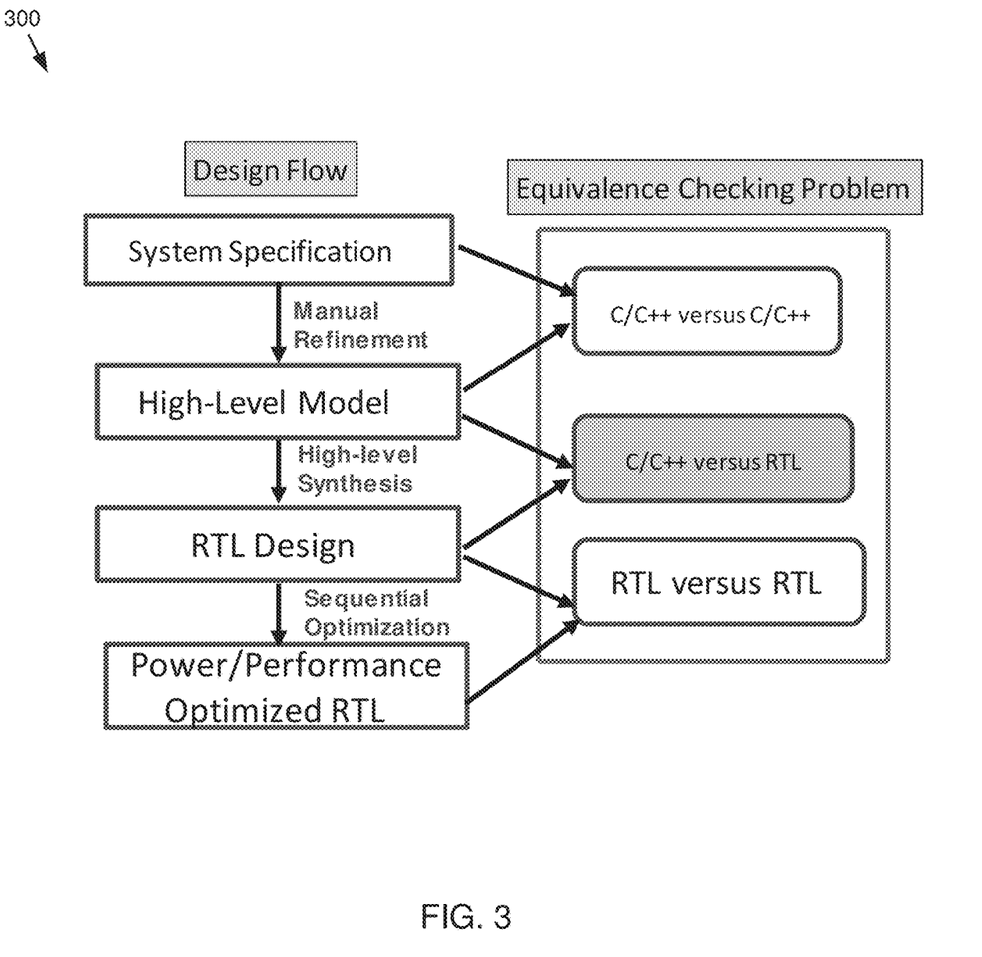
FIG. 3 is a diagram showing an equivalence checking problem in accordance with an embodiment of the present disclosure.

Referring now to FIG. 3, an embodiment depicting an example of an equivalence checking problem is provided. In equivalence checking, it may be necessary to determine how the inputs of both designs must be stimulated and how their outputs must be compared. Broadly, equivalence checking can be classified into a number of types, for example, combinational equivalence, sequential equivalence, cycle accurate equivalence, transaction equivalence, and pipelined equivalence. A combinational equivalence checking is used to check equivalence between two combinational designs that requires one-to-one mapping between the state elements. Whereas, for designs that contain sequential optimizations such as retiming, power-performance optimizations, there is no one-to-one mapping between the state elements. Sequential equivalence checking is used to check the validity of the sequential synthesis in a typical design flow. A typical design and verification flow is shown in FIG. 3, where a system specification may be received and through manual refinement a high-level model may be generated (both system specification and high-level model may be represented using programming languages such as C/C++/SystemC). High-level synthesis may be performed to create a hardware design typically represented at RTL. The equivalence checking between a high-level model and an RTL design is a difficult problem. The complexity of equivalence checking at this level of design flow may be attributed to the structural mismatches of the data-path logic and control-logic (e.g., serial versus parallel implementation), timing differences between the models (e.g., untimed versus timed model), language non-determinism of the specification model, PPA-optimizations of the implementation model, etc. Subsequently, a power/performance optimized RTL may be generated through sequential optimization from the initial RTL model in the design flow which may be checked for equivalence using RTL versus RTL equivalence checking solutions.

In some embodiments, the present disclosure may be used in the generation of a formal verification model from a specification model. In operation, a specification model and one or more formal friendly external custom libraries may be provided to a parser. The parser may be configured to then generate an intermediate representation, which is supplied to a semantic transformation backend module to generate a semantically transformed or "lowered" specification model. Accordingly, given a software specification in C/C++/SystemC (in some cases along with pre-verified custom library implementations that mimic the functionality of the standard library calls in the original specification), the semantic transformation step first performs a sequence of semantic transformation passes to generate a lowered software specification in a procedural language that is logically equivalent to the original software specification. In some embodiments, the lowered specification model may be machine generated, and may be represented using fixed set of language constructs. The lowered specification model may include the lowered sources of both the specification model as well as custom libraries, hence it may operate as a standalone model. In some embodiments, synthesis technology may be configured to operate on the lowered specification model, hence it may be agnostic to advanced language features used in the original specification model. The generated lowered model may be synthesized using off-the-shelf synthesis engines or symbolic execution engines for generating a formal verification model. One of the advantages of this flow is that the synthesized formal verification model may be used not only for equivalence checking but also for assertion-based verification of the software specification.

Figure 4:
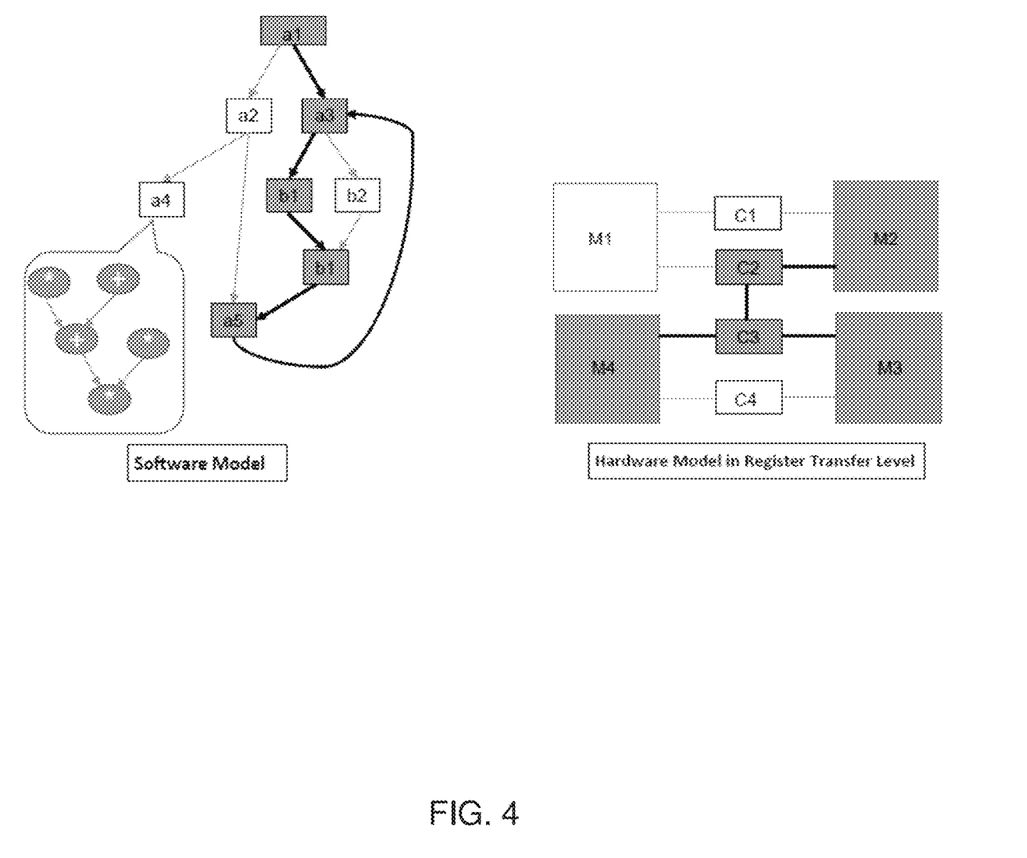
FIG. 4 is a diagram showing an example of case-splitting consistent with the verification process in accordance with an embodiment of the present disclosure.

In some embodiments, and referring now to FIG. 4, verification process 10 may be configured to perform partitioning of a design via case splits. Case Splits generally refer to manually partitioning the electronic design state-space into smaller regions based on some heuristics (typically called cases split constraints and modeled as assumptions in a verification tool) such that each region is easier to prove. For example, this may include partitioning a floating-point arithmetic circuit design into smaller logic based on one or more case split criterions. Some criteria may include, but are not limited to, the type of the floating-point numbers (e.g., Zero, Denormal, Normal, NaN, Infinity, etc.), the type of the floating-point operation (e.g., +, −, *, /, %, mod, etc.), and/or based on exponent difference. Highlighted boxes in FIG. 4 are feasible execution blocks in the software model and the hardware model after application of case-splitting.

In some embodiments, verification process 10 may utilize automatic case-splitting approaches. Automatic case-splitting generally refers to tool-based partitioning of the design state-space into smaller regions such that each region is easier to prove. To do so, the tool may implement techniques to analyze the entire design and locate the right set of partitioning variables/signals that assume values from its respective value domains.

In some embodiments, and as discussed above, verification process 10 may be configured to automatically derive case-splitting hints for C/C++ versus RTL sequential equivalence checking. Accordingly, embodiments included herein may be configured to use abstract interpretation (AI) techniques to infer numerical invariants for C/C++ reference models. AI generally refers to a technique for the sound approximation of the semantics of software programs, based on monotonic functions over ordered sets, especially lattices.

In some embodiments, these invariants can be used as case-splitting hints during equivalence checking. One form of AI is the semantic analysis discussed herein. In some embodiments, the numerical invariants from AI may correspond to an over-approximation of the set of reachable state-space. As such, they are sound case-splitting hints. The invariants obtained from the AI of the reference model may be helpful in a number of use cases. Some of these may include, but are not limited to, using the invariants as case-split hints, as helper assertions, and/or to derive one or more structural properties of the program.

Existing technologies may often use structural analysis over DFGs to automatically generate case-splits. No semantic analysis is performed. Also, precise invariant generation and case-splitting on internal variables of a design is difficult to generate in absence of semantic analysis. Abstract interpretation technology uses semantic analysis to generate over-approximate invariants over boundary variables as well as internal variables. Without automatic case-splitting, sequential equivalence checking does not scale for data-path and control-path intensive designs and it may be very hard for a user to find the right set of case-splitting candidate since the user is unaware of value domain of the intermediate variables in a design. A typical data-path design requires hundreds of case-splits for effective verification. Accordingly, the automatic case-split generation techniques described herein is necessary for building scalable equivalence checkers.

Figure 5:
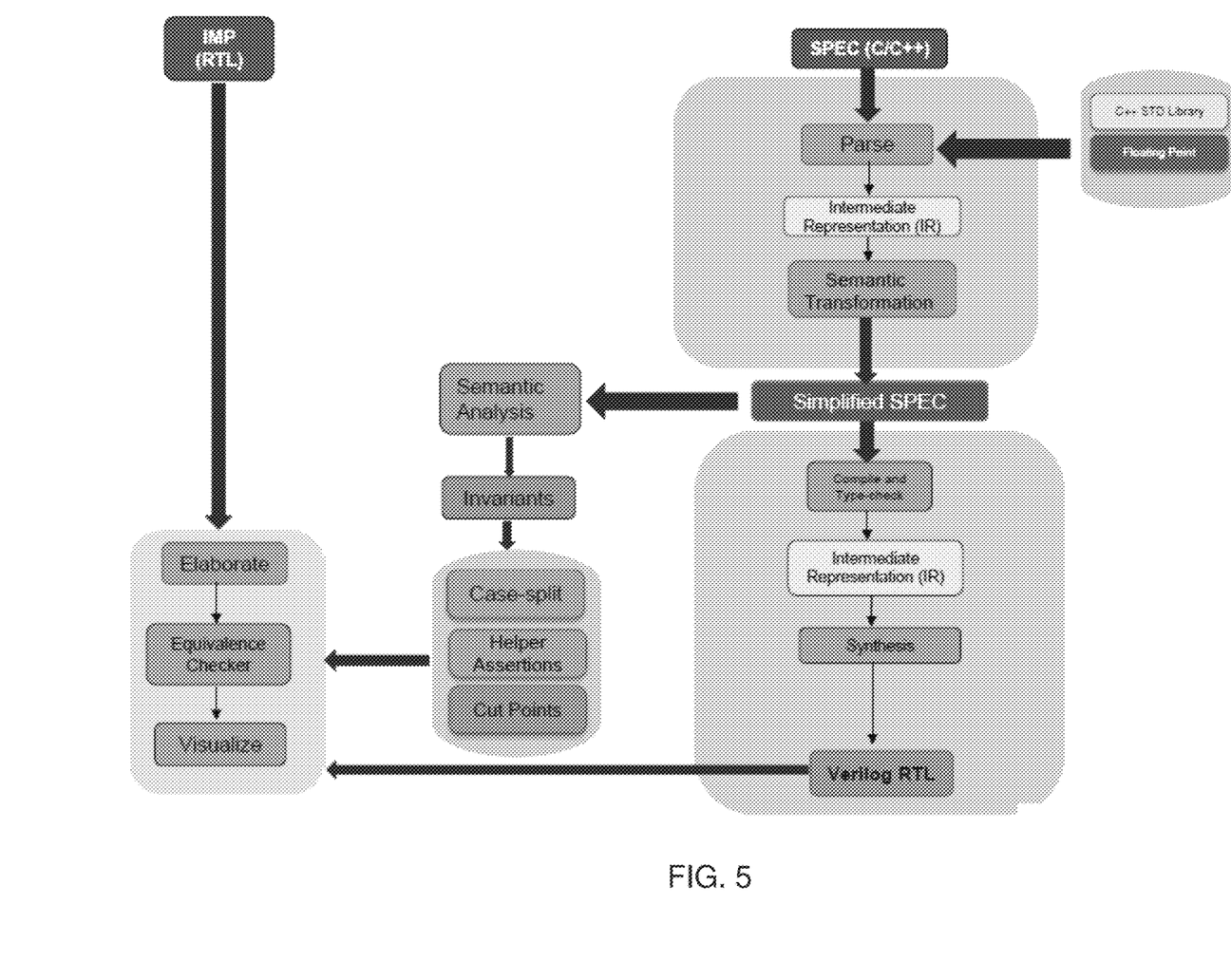
FIG. 5 is a flowchart depicting operations consistent with the verification process in accordance with an embodiment of the present disclosure.

Referring now to FIG. 5, a flowchart depicting operations of verification process 10 consistent with embodiments of the present disclosure is provided. Verification process 10 may receive both a reference model, commonly known as a software specification, and an implementation model at a register transfer level as shown in FIG. 5. The reference model may be sent to a parser, which may be configured to read the C/C++/SystemC++ source program and generate an intermediate representation ("IR"). This representation is the in-memory data structure that represents the source program. A semantic transformation technique may then be used to transform the IR into a simplified reference model. In this flow, the simplified reference model may be represented as a self-contained C program. A semantic analysis using Abstract Interpretation (AI) is performed on the simplified reference model, denoted in FIG. 5. as "Simplified SPEC", to infer numerical invariants for the C/C++ reference models. The invariant properties are a sound over-approximation of the semantics of the reference models, which holds true during every execution of the reference model. The precision of the generated invariants may depend on the underlying abstract domains. These invariants may be used to automatically derive case split hints, helper assertions as well as cut-points. A set of fine-grained case split hints may be generated from the invariants by partitioning the value domain of the variables that appear in the case split candidates. Due to the over-approximate nature of the case split candidates, the fine-grained case split hints may be passed through a user-guided filtering mechanism that is used to filter out infeasible case splits from the set of fine-grained case splits. The output of the filtering step may be the set of feasible case splits that are consistent with the execution of the reference model. The feasible case splits may be passed to the Equivalence Checker module, shown on the left of FIG. 5. for automatically decomposing the state-space of the design into smaller fragments, such that each fragment is easy to prove.

An example showing machine generated semantic preserving transformation from C++ to C is provided in FIG. 8. In the example provided in FIG. 8, a <new> header file may be received from a Custom Library. It may be a synthesis-friendly header implementing the placement new( ) function. Special macros (here RTL_*) may be used to specify the top-level module ports in the generated RTL. Generated names preserve original C++ scope and type information. It should be noted that this example is simplified for clarity purposes.

An example showing the synthesis of lowered C to RTL is provided in FIG. 9. In the example provided in FIG. 9, the generated RTL may preserve C/C++ semantics. The function call to add operation is in-lined in the RTL. This is a combinational example. It should be noted that the generated RTL can be sequential as well. It should be noted that this example is simplified for clarity purposes.

In some embodiments, verification process 10 may also include generating one or more invariants based upon, at least in part, the reference model. Generating one or more invariants may include applying a semantic analysis. Invariants are properties of a design that hold true in every execution of that design. Identifying good invariants is critical to the convergence of the equivalence checking proofs. However, invariant generation on structurally different designs is an extremely hard problem. The result of the semantic preserving transformation and configurable synthesis is an enabler for generating safety invariant properties on the miter logic containing the Cone of Influence (COI) of both specification and the implementation models. In some embodiments, safety invariant properties may be generated from the formal verification model using forward and backward analysis which aids in the verification process. It is worth noting that invariant generation from the original software specification is imprecise due to the absence of the actual source implementations of the standard library calls. However, the use of custom library implementation of these library calls helps to generate precise invariants. As shown in FIG. 5, a high-level synthesis module may be used to transform the C/C++ program to an RTL representation.

Figure 6:
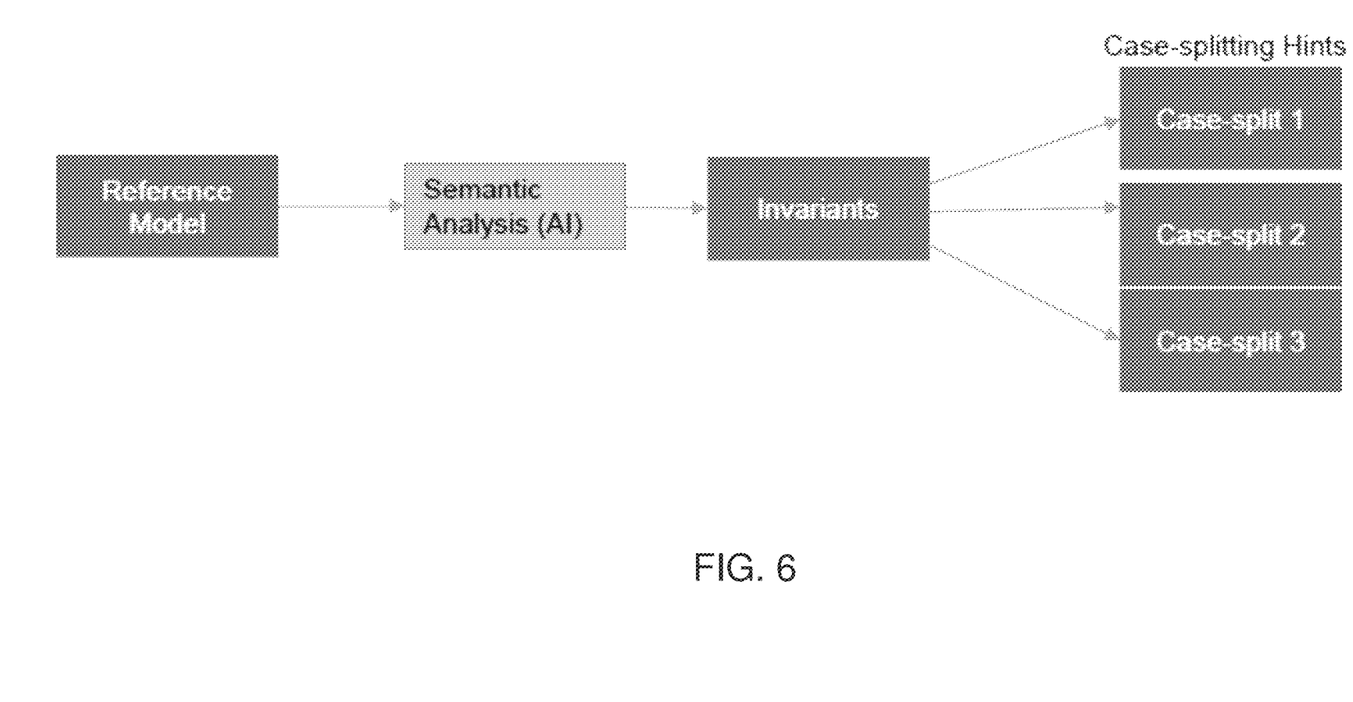
FIG. 6 is a flowchart depicting operations consistent with the verification process in accordance with an embodiment of the present disclosure.

In some embodiments, and referring now to FIG. 6, a diagram consistent with verification process 10 is provided. Embodiments may include automatically generating at least one case splitting candidate based upon the generated invariants. In some embodiments, verification process 10 may be configured to perform AI of reference models in order to infer case-splitting hints during sequential equivalence checking. In this way, verification process 10 may be configured to perform AI of the reference model over numerical abstract domains for inferring invariant properties. In some embodiments, verification process 10 may be configured to generate case-splitting candidates from over-approximate invariant properties for faster convergence. The precision of the invariant properties depends on the choice of the underlying abstract domains used in the AI of the reference model and hence the degree of over-approximation may be controlled by the user. Precise case-splitting candidates may be derived if the design is already constrained by assumptions or other case-split. One or more case-splitting candidates may be provided to the user for choosing the best candidates. Invariant generation using AI is far faster than existing approaches and, as a result, AI may be used as a pre-processing operation before invoking the equivalence checking proof.

In some embodiments, when using equivalence checking, the effect of case-splitting may be on both the reference model as well as the implementation model. Hence, case-splitting may be performed on those variables for which there exists a corresponding variable/signal on either side. For example: if Spec variable (X) corresponds to Imp variable (Y), then the case-splitting heuristic may be encoded in the tool as provided below:

assume (X==Y);

check_c2rtl-case_split-expression {X==1} -tag A check_c2rtl-case_split-expression {X==2} -tag B

. . .

Figure 7:
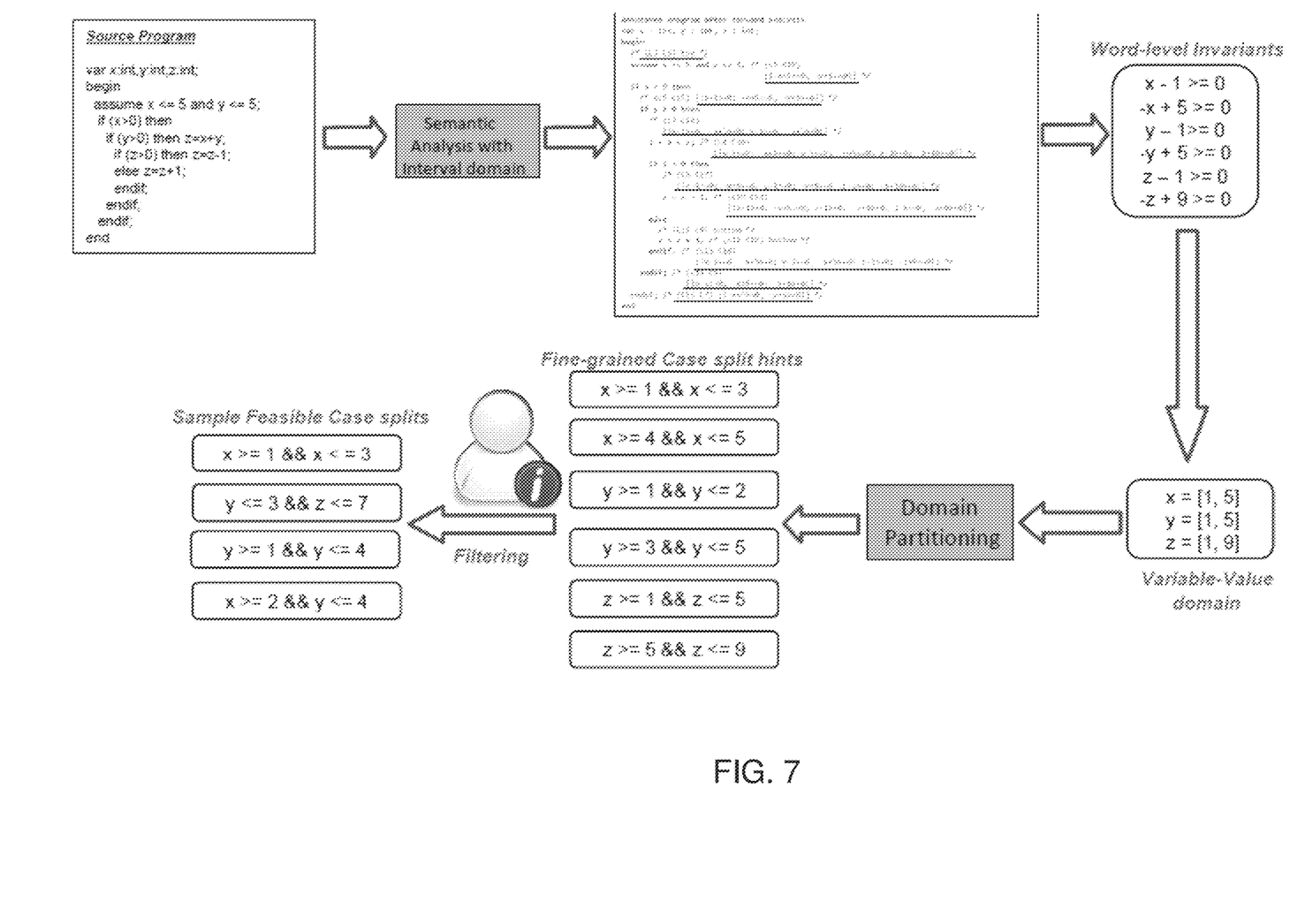
FIG. 7 is one example of a program consistent with the verification process in accordance with an embodiment of the present disclosure.

Referring now to FIG. 7, an embodiment showing an example of automatically deriving case splits in a software program using abstract interpretation over Interval abstract domain is provided. FIG. 7 shows a source program and an example annotated program after forward analysis using Interval domain. The invariants for each program statement are shown in underline. The invariant "top" denotes the top most element of the Interval lattice (abstract domain) and "bottom" denotes empty which is the bottom element of the Interval domain. The invariants obtained from semantic analysis may be summarized in the right-side box and marked as "Word-level Invariants". These invariants may be implicitly represented as Interval-shaped invariants where every program variable assume a value in the Interval domain and is syntactically denoted by "X=[lower_bound, upper_bound]" where "lower_bound" is the lowest Integer value assumed by the variable X and "upper_bound" is the highest Integer value assumed by the variable X. The invariants may then be partitioned into fine-grained case split hints using the domain partitioning technique that partitions the value domain of the variables that appear in the case split candidates.

Due to the over-approximate nature of the case split candidates, the fine-grained case split hints may be passed through a user-guided filtering mechanism that is used to filter out infeasible case splits from the set of fine-grained case splits. The output of the filtering step is the set of feasible case splits that are consistent with the execution of the reference model, which is shown by the lower leftmost boxes of FIG. 7.

In some embodiments, verification process 10 may be configured to perform case-splitting on a data-path design. An example showing case-splitting on a binary signal is provided below:

Consider 'x' is a 32-bit integer and 'y' is a 1-bit binary signal, the following formula (F) is difficult to prove with bit-blasting but may be easily solved by decomposing the solution-space of F using case splits on the propositional variable 'y'.

$$\{(x+y)*(x+y)==x*x+2*x*y+y*y\}$$ Formula (F)

With the Case splits, y=[0,0], and y=[1,1], the formula F can be easily proved using constant propagation, as shown below:

Case Split: y=[0,0], {(x+0)*(x+0)==x*x+2*x*0+0*0}

Case Split: y=[1,1], {(x+1)*(x+1)==x*x+2*x*1+1*1}

In some embodiments, verification process 10 may be configured to perform case split on bit-vectors, for example, whether a bit-vector is zero or not and/or whether the least significant bit ("lsb") or most significant bit ("msb") of a bit vector equals zero or not. Verification process 10 may also perform case splits on user-provided invariants.

As discussed above, embodiments of verification process 10 may be configured to utilize semantic analysis, which generates over-approximate invariant properties of programs. Conventional techniques uses DFG analysis which is structural analysis and not semantic analysis. Embodiments of the present disclosure may generate global invariants and, as such, may generate invariants properties using AI for boundary variables as well as internal variables. In some embodiments, the precision of invariants may depend on the underlying abstract domains. Hence, the degree of over-approximation may be controlled by the user/tool provider. Invariants from AI may have multiple use-cases, including, but not limited to, case-splits, helper assertions, deriving structural property of programs (relation between program variables), etc.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for use in an equivalence checking process associated with a formal verification of an electronic design comprising:
   receiving, using a processor, a reference model including a software specification and an implementation model at a register transfer level;
   generating one or more invariants based upon, at least in part, the reference model, wherein generating one or more invariants includes applying a non-structural, semantic analysis of a first language associated with the software specification and a second language associated with the implementation model, wherein the semantic analysis infers the one or more invariants based upon the reference model;
   automatically generating at least one case splitting candidate based upon, at least in part, the one or more generated invariants; and
   performing equivalence checking of at least a portion of the electronic design using the at least one case splitting candidate.

2. The computer-implemented method of claim 1, wherein the software specification is in C language or C++ language and the implementation model is written in Verilog RTL.

3. The computer-implemented method of claim 1, wherein automatically generating one or more invariants occurs during performing equivalence checking.

4. The computer-implemented method of claim 1, wherein the one or more invariants are utilized as a case splitting hint.

5. The computer-implemented method of claim 1, wherein the one or more invariants are utilized as a helper assertion or a cut point.

6. The computer-implemented method of claim 1, wherein the one or more invariants are utilized to derive one or more structural properties of a program.

7. The computer-implemented method of claim 1, wherein generating one or more invariants is based upon, at least in part, one or more internal variables.

8. The computer-implemented method of claim 1, further comprising:

providing the at least one case splitting candidate to an equivalence checker.

9. The computer-implemented method of claim 1, further comprising:
providing the one or more invariants to an equivalence checker.

10. The computer-implemented method of claim 5, further comprising:
providing the helper assertion or cut point to an equivalence checker.

11. A system for use in a formal verification of an equivalence checking process associated with electronic design comprising:
a computing device having at least one processor configured to receive a reference model including a software specification and an implementation model in a register transfer level, the at least one processor further configured to generate one or more invariants based upon, at least in part, the reference model, wherein generating one or more invariants includes applying a non-structural, semantic analysis of a first language associated with the software specification and a second language associated with the implementation model, wherein the semantic analysis is configured to generate an over-approximation of one or more invariant properties associated with a program, wherein the semantic analysis infers the one or more invariants based upon the reference model, the at least one processor further configured to automatically generate at least one case splitting candidate based upon, at least in part, the one or more generated invariants, the at least one processor further configured to provide the at least one case-splitting candidate to an equivalence checker to perform equivalence checking associated with the electronic design.

12. The system of claim 11, wherein the software specification is in C language or C++ language and the implementation model is written in Verilog RTL.

13. The system of claim 11, wherein automatically generating occurs during performing equivalence checking.

14. The system of claim 11, wherein the one or more invariants are utilized as a case splitting hint.

15. The system of claim 11, wherein the one or more invariants are utilized as a helper assertion or a cut point.

16. The system of claim 11, wherein the one or more invariants are utilized to derive one or more structural properties of a program.

17. The system of claim 11, wherein generating one or more invariants is based upon, at least in part, one or more internal variables.

18. The system of claim 11, wherein the at least one processor is further configured to provide the one or more invariants to an equivalence checker.

19. The system of claim 15, wherein the at least one processor is further configured to provide the helper assertion to an equivalence checker.

20. The system of claim 15, wherein the at least one processor is further configured to provide the cut point to an equivalence checker.

* * * * *